US009728971B2

(12) United States Patent
Robertazzi et al.

(10) Patent No.: US 9,728,971 B2
(45) Date of Patent: Aug. 8, 2017

(54) APPARATUS AND METHOD FOR OPTIMAL PHASE BALANCING USING DYNAMIC PROGRAMMING WITH SPATIAL CONSIDERATION

(71) Applicant: The Research Foundation for The State University of New York, Albany, NY (US)

(72) Inventors: Thomas G. Robertazzi, Mastic, NY (US); Steven Skiena, Setauket, NY (US); Kai Wang, Stony Brook, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 766 days.

(21) Appl. No.: 14/101,985

(22) Filed: Dec. 10, 2013

(65) Prior Publication Data

US 2014/0159483 A1    Jun. 12, 2014

Related U.S. Application Data

(60) Provisional application No. 61/735,367, filed on Dec. 10, 2012, provisional application No. 61/866,803, filed on Aug. 16, 2013.

(51) Int. Cl.
*H02J 3/26* (2006.01)
*H02J 3/00* (2006.01)

(52) U.S. Cl.
CPC ........... *H02J 3/26* (2013.01); *H02J 2003/007* (2013.01); *Y02E 40/50* (2013.01); *Y02E 60/76* (2013.01); *Y04S 40/22* (2013.01); *Y10T 307/273* (2015.04)

(58) Field of Classification Search
None
See application file for complete search history.

(56) References Cited

U.S. PATENT DOCUMENTS

| 5,604,385 | A | 2/1997 | David |
| 6,018,203 | A | 1/2000 | David |
| 7,242,110 | B2 | 7/2007 | Matsumoto et al. |
| 9,041,246 | B2 * | 5/2015 | Black ................. H02J 3/26 307/14 |

(Continued)

OTHER PUBLICATIONS

Gupta, Nikhil et al., A Novel Strategy for Phase Balancing in Three-Phase Four-Wire Distribution Systems, Copyright 2011 IEEE, pp. 1-7.

(Continued)

*Primary Examiner* — Jared Fureman
*Assistant Examiner* — Aqeel Bukhari
(74) *Attorney, Agent, or Firm* — The Farrell Law Firm, P.C.; John F. Gallagher III

(57) ABSTRACT

Provided are an apparatus and method for load-balancing of a three-phase electric power distribution system having a multi-phase feeder, including obtaining topology information of the feeder identifying supply points for customer loads and feeder sections between the supply points, obtaining customer information that includes peak customer load at each of the points between each of the feeder sections, performing a phase balancing analysis, and recommending phase assignment at the customer load supply points.

25 Claims, 10 Drawing Sheets

(56) References Cited

U.S. PATENT DOCUMENTS

2012/0022713 A1* 1/2012 Deaver, Sr. ............ G05B 17/02
 700/298

OTHER PUBLICATIONS

Gaffney, Michelle N., Intelligent Power Management: Improving Power Distribution in the Field, pp. 6.
Lin, Chia-Hung et al., Heuristic Rule-Based Phase Balancing of Distribution . . . , IEEE Transactions On Power Systems, vol. 20, No. 2, May 2005, Copyright 2005 IEEE, pp. 709-716.
Wang, Kai et al., Phase balancing algorithms, Electric Power Systems Research 96 (2013) 218-224, Copyright 2012 Elsevier B.V.
Chen, Tsai-Hsiang, et al., Optimal Phase Arrangement of Distribution Transformers Connected to a Primary Feeder for System Unbalance . . . , Copyright 1999 IEEE, pp. 145-151.
Gandomkar, M., Phase Balancing Using Genetic Algorithm, Copyright IEEE, pp. 378-379.
Zhu, Jinxiang, et al., Phase Balancing using Mixed-Integer Programming, IEEE Transactions on Power Systems, vol. 13, No. 4, Nov. 1998, Copyright 1997 IEEE, pp. 1487-1492.
Zhu, Jinxiang, et al., Phase Balancing using Simulated Annealing, IEEE Transactions on Power Systems, vol. 14, No. 4, Nov. 1999, Copyright 1998 IEEE, pp. 1508-1513.
Huang, M.-Y., et al., Three-phase balancing of . . . , IET Gener. Transm. Distrib., 2008, vol. 2, No. 3, pp. 383-392, Copyright The Institute of Engineering and Technology 2008.

* cited by examiner

APPARATUS AND METHOD FOR OPTIMAL PHASE BALANCING USING DYNAMIC PROGRAMMING WITH SPATIAL CONSIDERATION

PRIORITY

This application claims priority to Provisional Patent Application Nos. 61/735,367 and 61/866,803, filed with the U.S. Patent and Trademark Office on Dec. 10, 2012 and Aug. 16, 2013, respectively, the contents of each of which are incorporated herein by reference.

GOVERNMENT RIGHTS

This invention was made with government support under grant number DE-OE0000220 awarded by the Department of Energy. The government has certain rights in the invention.

BACKGROUND OF THE INVENTION

1. Field of the Invention

The present invention generally relates to a system and method for load balancing of multi-phase electric distribution feeders and, in particular, to an algorithm usable to determine optimal tap changes for phase swapping.

2. Description of the Related Art

Phase balancing aims to reduce three phase load unbalance, to avoid severe voltage drops in electric power feeder circuits. The majority of electric power distribution systems utilize feeders that carry three-phase alternating power. It is desirable for electric utilities to provide approximately equal loads on each phase. A problem arises in that, even for initially balanced loads, over time as the loads change a loads unbalance will arise. Significant load variation on feeder phases can arise during a single day.

There are two major phase balancing methods: feeder reconfiguration at a system level and phase swapping at the feeder level. See, J. Zhu, G. Bilbro, M. Chow, *Phase Balancing using Simulated Annealing*, IEEE Power Sys. Trans., Vol. 14, No. 4, pp. 1508-1513, November 1999. In electric power literature, phase swapping is less studied than feeder reconfiguration.

In a three-phase system, phase unbalance limits an amount of power transferred on a feeder, since one phase of an unbalanced feeder will reach its maximum carrying capacity while the other phases are underutilized. Such poor utilization of a feeder in a power distribution network can result in unnecessary outages, unnecessary feeder expansion, and unnecessary system upgrades, resulting in decreased reliability and increased utility costs. As the highest loaded phase nears maximum ampacity, phase unbalance can lead to preventive breaker/relay tripping and feeder shutdown, restoration of which will increase electric utility operating costs.

Electric utility crews periodically rebalance feeders, typically during maintenance and restoration. For example, a suburban northeast U.S. utility will rebalance feeders once the unbalance exceeds 15%. Generally, ten to fifteen minutes are needed to perform load switching. A complete load switch can take an hour, excluding travel time to a location where the load switch must be performed. Completion of a load switch by a crew of two employees can cost several hundred dollars. Additional preparatory work, such as scheduling, can bring the total cost of rebalancing to several thousand dollars for a single tap change.

Tap changes generally occur when a new customer is to be connected or the phase balance on an existing feeder becomes significantly unbalanced. Rebalancing a feeder is not a permanent solution, since a re-balanced feeder can readily drift into unbalance over time. The three factors considered in making a decision to rebalance a feeder are typically monetary cost of making the tap changes, expected increase in feeder balance, i.e., energy savings, and duration of customer power interruption.

Similar problems of effective phase balancing may arise in limited electric power systems, such as electric power systems provided in a tactical battlefield environment, often due to insufficient operator training and experience. See M. N. Gaffney, *Intelligent Power Management: Improving Power Distribution in the Field*. Phase balancing methods have been proposed. See, U.S. Pat. No. 5,604,385 to David, U.S. Pat. No. 6,018,203 to David, and U.S. Pat. No. 7,242,110 to Matusmoto, et al. Variables in the phase balancing problem are identification of phases connected to each load, with a goal to minimize a degree of feeder unbalance. Algorithms have been proposed to solve phase balancing problem. See, J. Zhu, et al. (IEEE Power Sys Trans, November 1998), which proposes a mixed-integer algorithm. However, the mixed-integer algorithm has a drawback that the objective functions can only be linear. As mentioned above, J. Zhu, et al. (IEEE Power Sys Trans, November 1999), propose expanding nonlinear objective functions by introduction of simulated annealing.

In 2000, a genetic algorithm was proposed. See, Chen, T. H., et al., *Optimal Phase Arrangement of Distribution Transformers Connected to a Primary Feeder for System Unbalance Improvement and Loss Reduction Using a Genetic Algorithm*, IEEE Power Sys. Trans, Vol. 15, No. 3, August 2000, pp 994-1000. Also see, Gandomkar, M., *Phase Balancing Using Genetic Algorithm*, 39th Int'l. Univ. Power Engineering Conf., September 2004, pp. 377-379. A heuristic greedy algorithm has also been proposed. See, Lin, Chia-Hung, et al., *Heuristic Rule-Based Phase Balancing of Distribution Systems by Considering Customer Load Patterns*, IEEE Power Sys. Trans., Vol. 20, No. 2, May 2005, pp 709-716. An immune algorithm has also been proposed. See, Huang, M-Y., et al., *Three-phase Balancing of Distribution Feeders Using Immune Algorithm*, IET Gen., Trans. and Dist., August 2007, pp. 383-392. These heuristic algorithms can get near-optimal solution quickly, but fail to guarantee optimal solutions.

The combinatorial optimization problems have not produced any known efficient algorithms capable of always producing optimal solutions. For those problems that computer scientists have been shown to be NP-Complete (NPC), there is convincing evidence that no correct, efficient algorithms can exist. An efficient algorithm for any one of the hundreds of known NPC problems would imply efficient algorithms for all of them, implying that all are equally hard to compute.

A phase balancing problem exists that is the equivalent to integer partitioning, a well-known NPC problem. An efficient algorithm for phase balancing which always produced optimal solutions would imply efficient algorithms for all problems in NP, which computer scientists consider extremely unlikely. However, heuristic algorithms that produce near optimal solutions with reasonable efficiency are possible. See, Skiena, S., *The Algorithm Design Manual*, 2d Ed., Springer, 2008.

Therefore, a dynamic programming algorithm is introduced to obtain an optimal solution for phase balancing problem in a reasonable running time, and to balance both the entire feeder and each section along the feeder, thereby avoiding a shortcoming of conventional systems in which the three phase current is balanced at the beginning of the feeders, but is not balanced at other positions of the feeders. See, Wang, K., Skiena, S., and Robertazzi, T. G, *Phase Balancing Algorithms*, Elec. Power Sys. Research, Vol. 96, March 2013, pp. 218-224.

Accordingly, an apparatus and method utilizing a dynamic programming algorithm are provided that solves phase balancing problems along each part of the feeder that conventional systems fail to address.

SUMMARY OF THE INVENTION

The present invention provides an apparatus and method for load-balancing of a three-phase electric power distribution system that has a multi-phase feeder by obtaining topology information of the feeder that identifies supply points for a plurality of customer loads and feeder sections between the supply points, that obtains customer information, including peak customer load at each of the points between each of the plurality of feeder sections, that performs a phase balancing analysis, and that recommends phase assignment at one or more supply points for the plurality of customer loads.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF THE PREFERRED EMBODIMENTS

The following detailed description of certain embodiments of the present invention will be made with reference to the accompanying drawings. In describing the invention, explanation of related functions or constructions known in the art are omitted for the sake of clearness in understanding the concept of the invention, to avoid obscuring the invention with unnecessary detail.

Figure 1:
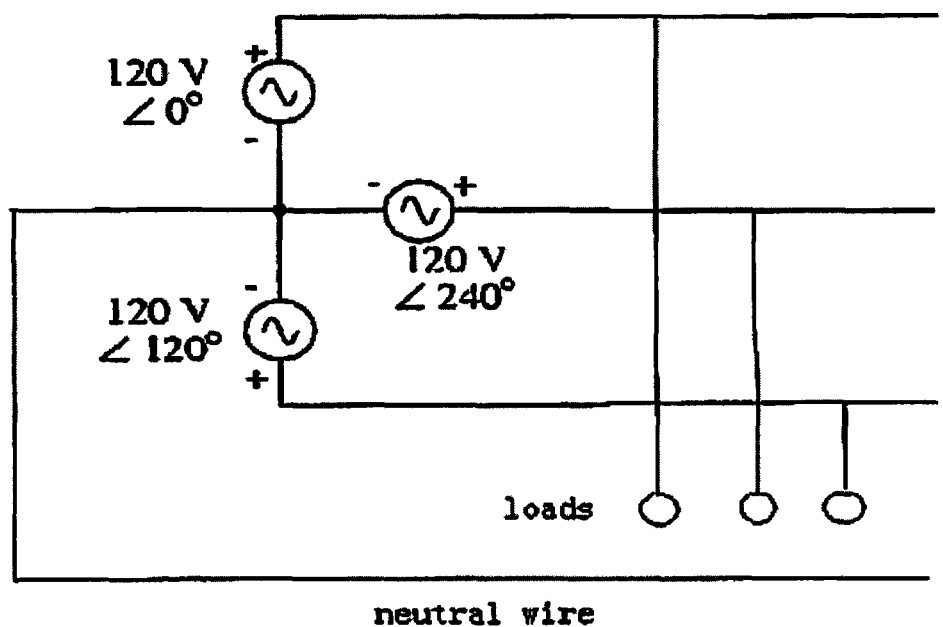
FIG. 1 illustrates a conventional three phase wiring diagram.

A dynamic programming algorithm is provided. As background for purposes of application of the algorithm, a linear feeder is assumed, with generation input provided on the left side and loads on the right side, as shown in FIG. 1. An objective function is to minimize a weighted sum of the degree of imbalance of each section along the feeder for a given number of tap changes. For N loads on a linear feeder, N objective function matrices are created, i.e., one matrix for each section, as well as N cost matrices.

For each matrix in both sets, rows are provided on a horizontal axis corresponding to potential load on phase A and columns are provided on a vertical axis corresponding to potential load on phase B. Thus, the (i,j)th entry of the kth objective function matrix is the objective function value with partial total load i for phase A for the first k sections and with partial total load j for phase B for the first k sections. Implicitly, the partial total load on phase C is a total load on the first k sections minus load i and minus load j for the first k sections. Also, the (i,j)th entry of the kth cost matrix is a minimum number of tap changes needed to achieve the corresponding objective function in the (i,j)th entry of the kth objective function matrix, thereby presenting an issue of how to compute the (i,j)th entry in the kth objective function matrix.

The load on phase A is i for the first k sections, and the load on phase B is j for the first k sections. Therefore, the load on phase C is a total load for the first k sections minus i and minus j. Accordingly, the (i,j)th entry in the objective function matrix is an absolute difference between the maximum of the loads on each phase minus the average load per phase for the first k sections, and this difference is divided by an average load per phase for the first k sections.

On the other hand, the (i,j)th entry of the kth cost matrix, which is the minimum number of tap changes to achieve the corresponding objective function value, is generated by a recursion, as discussed below, with different recursions depending on whether loads are connected to one phase or two/three phases. Once all of the matrices are generated, what is essentially a shortest path algorithm can be run from matrix to matrix where the distances are the objective function entry values.

However, in generating the possible paths through the matrices, there are some constraints on which entries in the (k+1)st matrix an entry in the kth matrix can be connected to. For instance, if one is at entry (4,5) with a load of '1' on phase C in a third objective function matrix, a path can connect to entry (6,5) with a load of 1 on phase C in a fourth matrix if the fourth load is '2', which is a single phase load, but a path cannot connect to (8,5) with a load of one on phase C in the fourth matrix.

Thus, unlike a Dijkstra shortest path algorithm, the algorithm of the present invention generates all possible feasible paths. However, these constraints reduce the number of paths to be considered. Actually, one more set of matrices is generated as the recursion is run to record the associated paths for future use. This calculation is performed in k path matrices, using similar definitions of i and j, with an (i,j)th entry of the kth matrix as a pointer to a position of a parent entry along a path in a k−1st objective function matrix.

To obtain a solution, an input parameter (M) is fixed to the algorithm as the maximum number of allowed tap changes. A last cost matrix is used to determine a set of solutions that meet this constraint. A solution is selected with the optimal objective function value from the remaining solutions. Upon selection of an optimal solution, the phase assignment is retrieved from the corresponding path matrix.

Alternately, a table of is created of the optimal solution for each specific number of tap changes. To create a pth row in the table, one repeats these steps, and keeps only the solutions with p tap changes.

To save memory, a different notation is used to describe status, with L(i) being load on each phase after a first i loads on the feeder, with a change of state space from C(i, j, k) to C(da, db, i), with C(i, j, k) being a cost to achieve a total load of i on phase a and total load of j on phase b, after the first k loads, leaving the total load on phase c implicit; and C(da, db, i) being a cost to achieve a difference (delta) load on phase a from L(i), a delta load on phase b from L(i) after the first i loads, leaving the delta load on phase c implicit.

Table 1 provides an example feeder with single phase loads.

TABLE 1

| Load size: | 2 | 1 | 2 | 1 |
|---|---|---|---|---|
| Phase: | A | B | C | A |

The above-described method reduces complexity and allows for deletion of solutions with very large deltas, thereby achieving significant memory savings, without which algorithm scalability would be limited.

Figure 2:
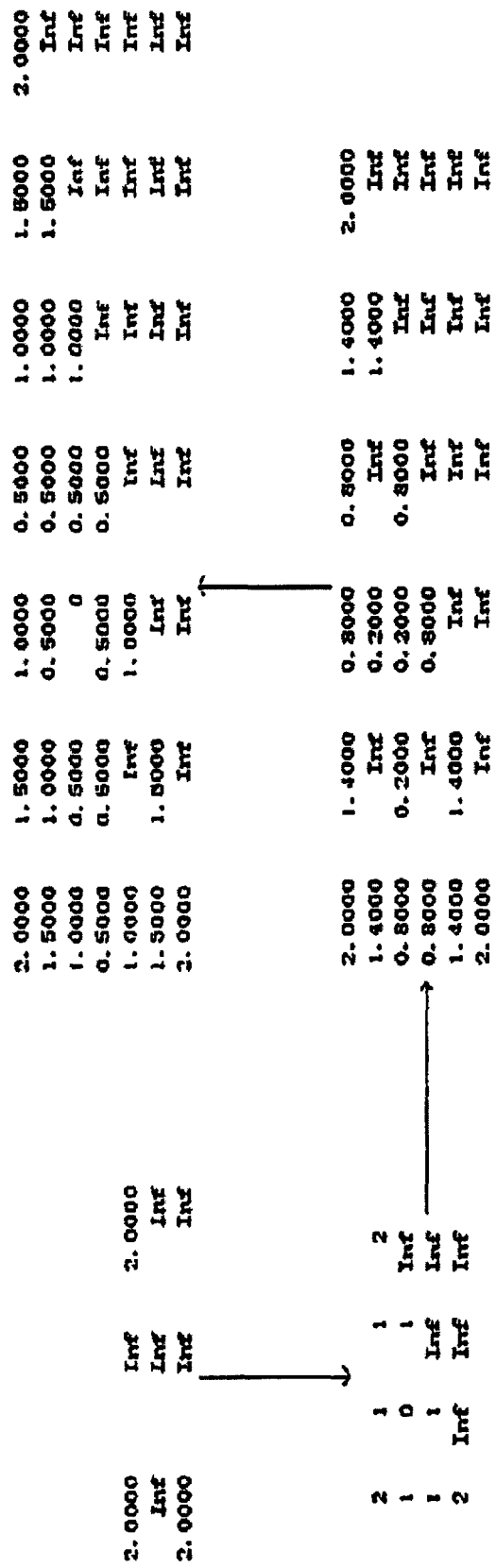
FIG. 2 provides an example of objective function values matrices according to an embodiment of the present invention.
Figure 3:
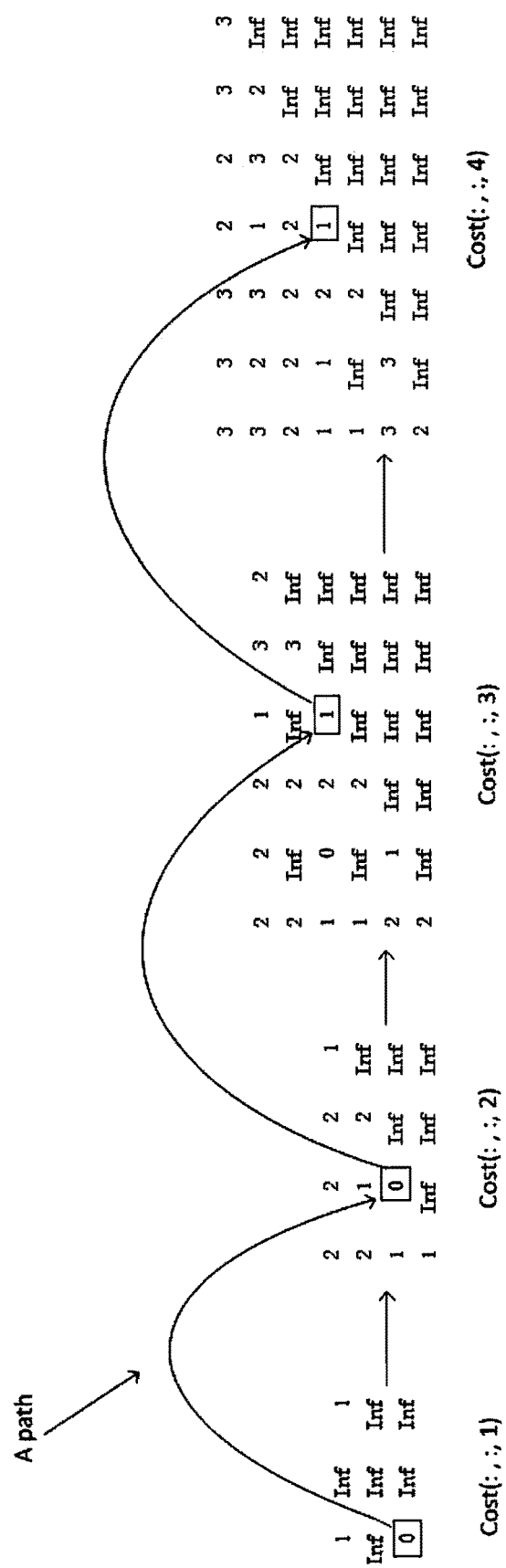
FIG. 3 provides an example of cost matrices according to an embodiment of the present invention.

FIGS. 2 and 3 provide examples of objective function values matrices and cost function matrices of a feeder with four single phase loads utilized with the dynamic programming algorithm of the present invention, to provide three main objectives of avoiding overload, balancing three phase current along the feeder, and reducing the number of phase changes, thereby saving labor and associated cost.

Table 1 shows four load sizes, 2, 1, 2 and 1, and initial phases of A, B, C and A. Status [2,0,1] can indicate a load of 2 on phase A, a load of 0 on phase B, and addition of the 1st load. Therefore, to achieve status [2, 0, 1], 0 tap changes are needed, as indicated in the entry in the path in the first matrix of FIG. 3, since we don't need to change phase of the first load. Similarly, zero taps changes are needed (see entry in path in second matrix in FIG. 3) to achieve status [2, 1, 2]. However, for status [2, 3, 3] that is circled in FIG. 3, one tap change is needed (see entry in path in 3d matrix of FIG. 3) to move the third load from phase C to phase B from parent status [2, 1, 2]. As for status [3, 3, 4], we still need 1 tap change (see entry in path in fourth matrix in FIG. 3) since parent status is [2, 3, 3] and this parent status needs one tap change, and we didn't move the fourth load.

Figure 4:
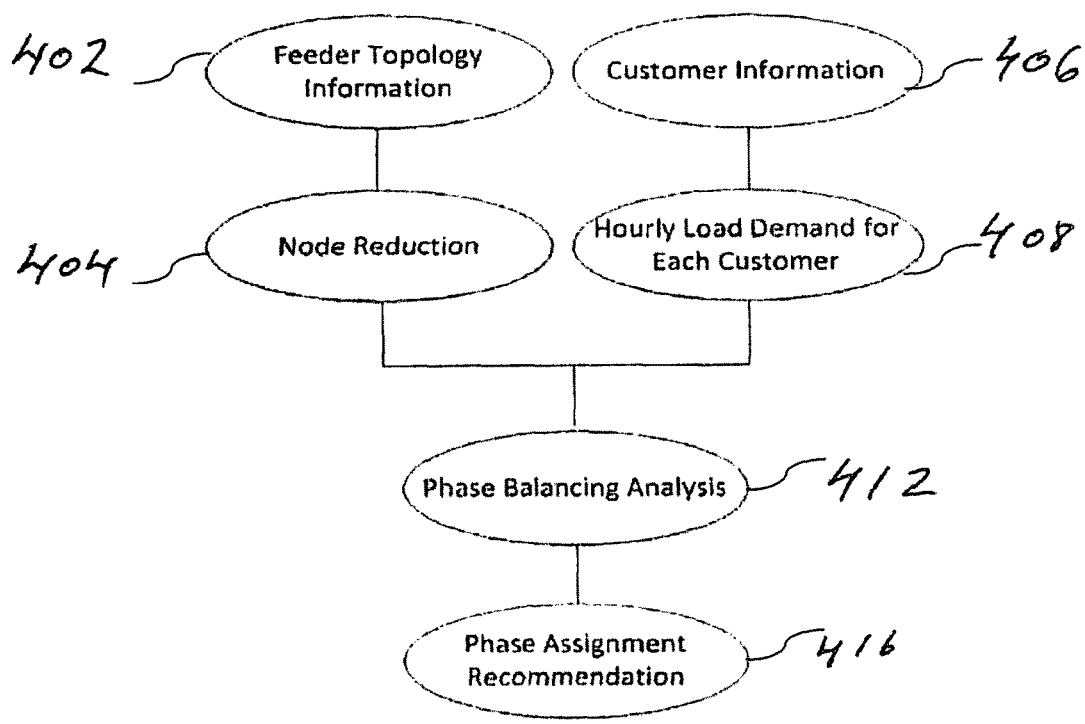
FIG. 4 is a flowchart of a phase balancing method according to an embodiment of the present invention.

FIG. 4 illustrates an overall structure for phase balancing of distribution feeders in which node connection and hourly load demand information is obtained for each node from feeder topology information and customer information. Based on the obtained information, a phase balancing analysis is performed and a phase assignment recommendation is provided.

As shown in FIG. 4, feeder topology information is obtained in step 402 and customer information is obtained in step 406. The feeder topology information processed for node reduction in step 404 and hourly load demand for each customer is obtained in step 408. The node reduction and hourly load demand information is input into a phase balancing analysis in step 412 and a phase assignment recommendation is provided in step 416.

Figure 5:
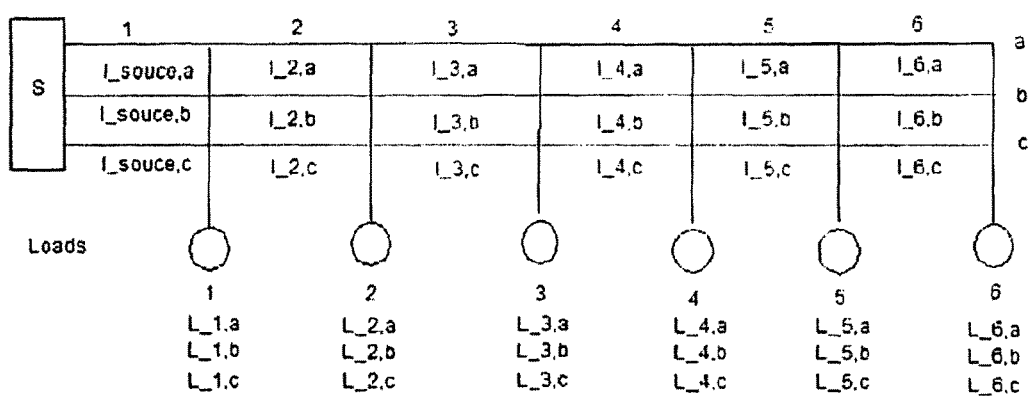
FIG. 5 illustrates a radial feeder with connecting branches and loads according to an embodiment of the present invention.
Figure 6:
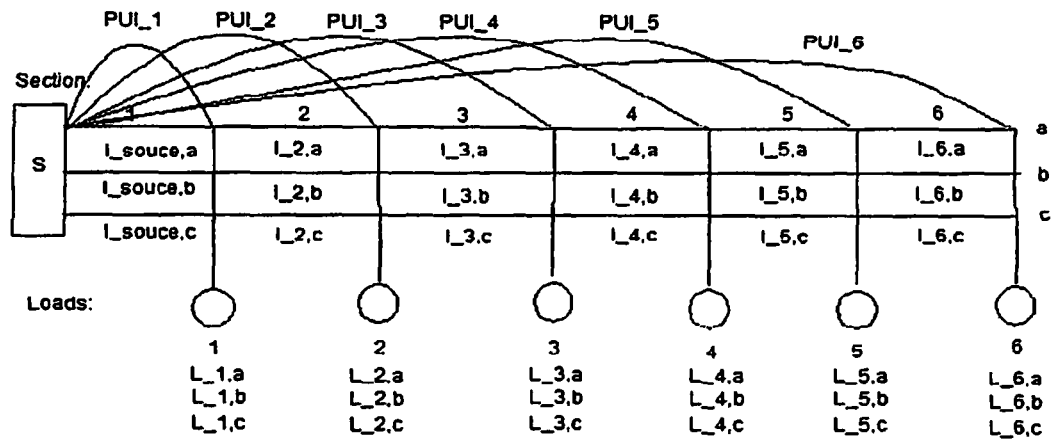
FIG. 6 illustrates a phase unbalance index provided on the radial feeder of FIG. 5.

FIG. 5 illustrates a radial feeder (F) connecting a source (S) via branches (a, b, c) to loads ($Li_{,1}$, $Li_{,2}$, $Li_{,3}$). The feeder is divided into nodes and sections, with $I_{i,j}$ denoting current on phase j of section i, and $L_{i,j}$ denoting current (load) demand of node i on phase j. The algorithm determines optimal phase assignment for each load, thereby minimizing unbalanced flow at monitored sections for each number of tap changes less than a designated maximum number of tap changes. FIG. 6 illustrates a phase unbalance index provided on the radial feeder of FIG. 5. In FIG. 6, numbers 1-6 indicate a feeder section, currents i are indicated for each feeder section, and numbering is provided above and loads, which are shown as circles, are indicated beneath each corresponding circle. A Phasing Unbalance Index (PUI) 1 is provided as a phase imbalance of feeder section 1, PUI 2 is a phase imbalance of feeder sections 1 and 2, and PUI 3 is a phase imbalance of feeder sections 1, 2 and 3. The PUI is a mathematical function that maps an amount of unbalance on each phase, i.e., a difference between phase current and an average measure of the current on all three phases, to a single number representing the degree of unbalance. Such functions include applications and operators such as sum or product of absolute differences that may be normalized. Such functions may also include functions that raise each difference by an exponent and then use operators such as maximum, sum or product function to create a single number representing the degree of unbalance, along with a possibly of some normalization. Alternatively, a degree of balance may be used in the optimization, e.g., by taking an inverse of the degree of unbalance or by use of another inverting function.

To balance three phase load flows along the entire feeder, the three phase flow in each section must be balanced. Kirchhoff's law provides that the current on a phase $\phi$ flowing out of a section j equals the current on phase $\phi$ from the source minus the total current on phase $\phi$ of the first j−1 sections, as summarized in Equation (1) for the three phases, i.e., $\phi$=a, b, c.

$$I_{j,\phi} = I_{source,\phi} - \Sigma_{i=1}^{j-1} L_{i,\phi}, \quad (1)$$

where j is a section index and i is a load index, with j≥2.

For balancing of $\Sigma_{i=1}^{k} L_{i,a}$, $\Sigma_{i=1}^{k} L_{i,b}$ and $\Sigma_{i=1}^{k} L_{i,c}$, for k=1 to N, an objective PUI function is utilized, according to Equation (2):

$$PUI_i = \frac{Max(|I_{a,i} - I_{avg_i}|, |I_{b,i} - I_{avg_i}|, |I_{c,i} - I_{avg_i}|)}{I_{avg_i}} * 100\%, \quad (2)$$

where $I_{a,i}$, $I_{b,i}$ and $I_{c,i}$ are total current loads on phases 1, 2 and 3 of section i, and $I_{avg_i}$ is a mean value of the current load on each single phase of section i.

Single phase loads are considered as a subset of the three phase loads, assuming that all loads are connected to three phases, with the load range set as integers between 1 and 100, with larger loads scaled to this range. To avoid overload, the current on each phase has to be smaller than the line capacity.

A first approach limits each PUI of each of the first i sections is limited under a threshold ($PUI_i$<=threshold), with i=1 to N, or the threshold is set by an operator. A binary search can alternatively be performed to determine a minimum possible threshold.

A second approach minimizes a weighted sum (S) of the PUI for each feeder section according to Equation (3):

$$S = \sum_{i=1}^{i=N} w_i * PUI_i, \quad (3)$$

with $w_i = \Sigma I_{\phi,i}$, $I_{\phi,i} \le C_i$; $\phi$ denoting one of phases a, b and c; i denoting an index of section from 1 to N; and $C_i$ denoting phase line capacity of phase j of section i.

Two feeder types are considered, single phase loads and two or three phase loads. Single phase loads connect to one of the three phases of a feeder. Two and three phase loads connect to two phases or to all three phases of the feeder. The single phase loads have three tap change possibilities, while the two and three phase loads have six tap change possibilities, as summarized in Table 2.

TABLE 2

| Original phase | Valid rephasing schemes | | |
|---|---|---|---|
| 3φ | abc | abc | acb |
|  |  | bca | bac |
|  |  | cab | cba |
| 2φ | ab | ab* | ba* | a*b |
|  |  | b*a | *ab | *ba |
|  | bc | bc* | cb* | b*c |
|  |  | c*b | *bc | *cb |
|  | ac | ac* | ca* | a*c |
|  |  | c*a | *ac | *ca |
| 1φ | a | a** | *a* | **a |
|  | b | b** | *b* | **b |
|  | c | c** | *c* | **c |

Figure 7:
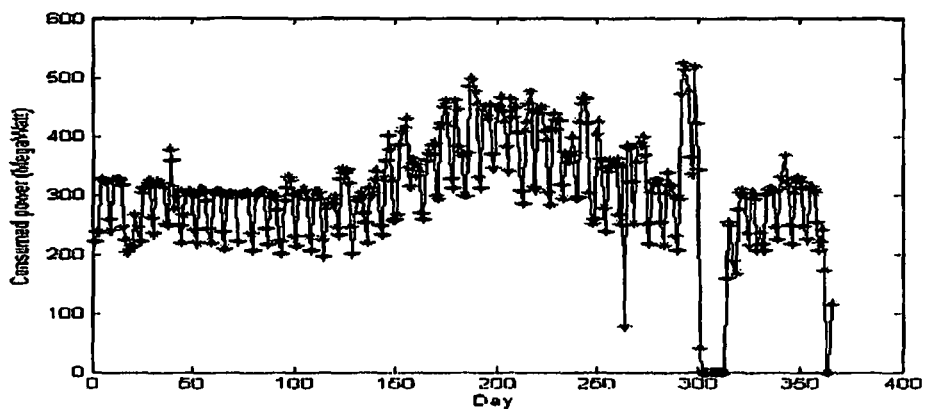
FIGS. 7 and 8 illustrate empirical yearly and daily load profiles, respectively.
Figure 8:
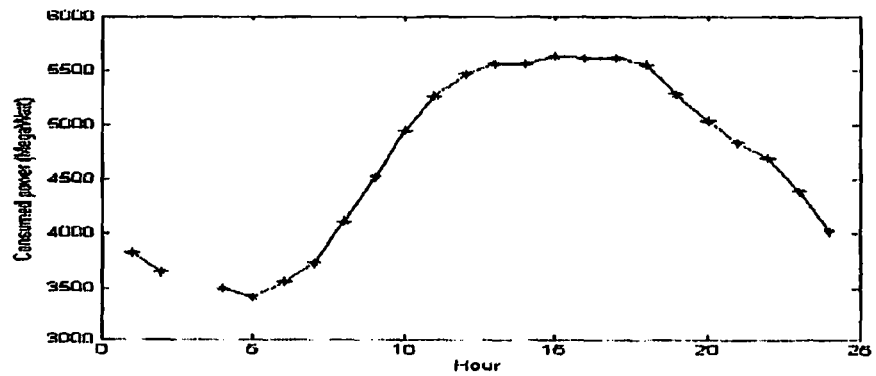

FIGS. 7 and 8 illustrate empirical yearly and daily load profiles, respectively, collected from customer hourly load data utilizing conventional metering. FIGS. 7 and 8 provide load profiles illustrating peak days falling during the summer and autumn, with daily peak hours during the afternoon. The large amount of data presents computational difficulties if a phase balancing recommendation for an upcoming year is to be based on hourly load data of a prior year. Evaluation of the load pattern is considered, and phase balancing analysis can be based on summer peak or summer peak day loading, due to computational load.

The optimal phase balancing algorithm of the embodiments of the present invention is NP-Complete (NPC) even with two phases and no cost per tap change, because it is equivalent to the integer partition problem and the integer partition problem is NPC. The hardness of integer partition depends upon large numbers, because it is not strongly NPC. For the phase balancing problem, the loads range between one and several hundred amperes. Assuming n loads, with the ith load having values, i.e., weights, of $l_{i,a}$, $l_{i,b}$ and $l_{i,c}$ on three phases that are currently assigned to a feeder.

Weights assumed of all loads are integers, with a total feeder load (T) for phases a to c provided by Equation (4):

$$T = \Sigma_{i=1}^{n} \Sigma_{\phi=a}^{c} l_{i,\phi} \quad (4)$$

The algorithm runs faster with a smaller T and loads can be scaled to reduce T, providing an optimal solution produced by the dynamic programming algorithm, with the scaling being a source of approximation. The algorithm which runs in $O(nT^2)$ to find the minimum number of changes to reach a particular quality criteria. The total load on phase i is denoted by $L_i$. Because there are three phases, there are approximately $T^2$ sets of possible values for $L_1$, $L_2$, and $L_3$, since both $L_1$ and $L_2$ are integers between 0 and T, and $L_3 = T - L_1 - L_2$, $L_3$ would be specified after one has $L_1$ and $L_2$.

The algorithm enumerates each possible partition of T into $L_1$, $L_2$, and $L_3$. In particular, for each partition P, the algorithm determines moves from a current state to P using a minimum number of changes. Evaluation of each of $O(T^2)$ partitions is performed according to the objective function, to eliminate each unacceptable partition and to determine a minimum cost and good-enough transformation.

Figure 9:
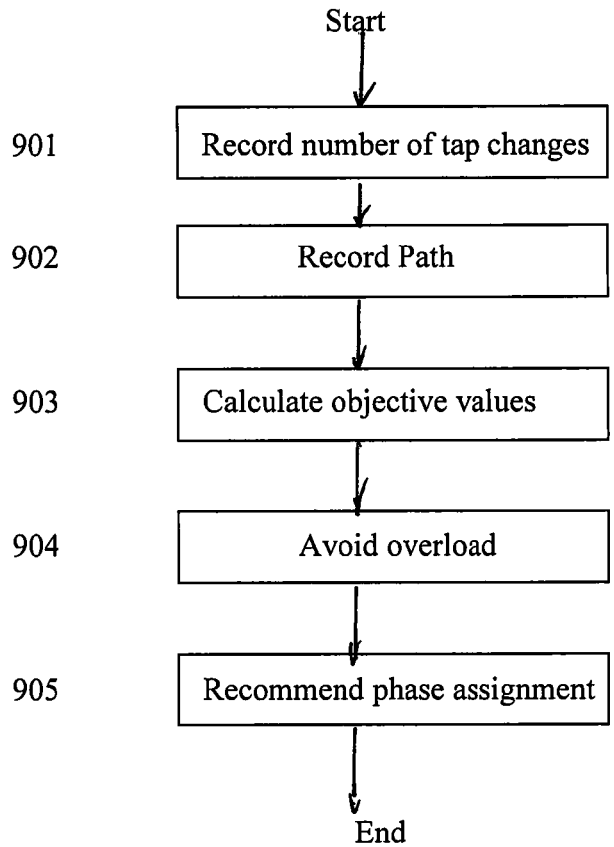
FIG. 9 is a flowchart of a phase balancing method according to an embodiment of the present invention.

FIG. 9 is a flowchart of a phase balancing method according to an embodiment of the present invention. In step 901 a number of tap changes is recorded, with recurrence being used to record number of tap changes and C[x,y,i] being defined as minimum cost (in terms of number of moves) to realize a balance of $L_1 = x$, $L_2 = y$ and implicitly $L_3 = T - L_1 - L_2$ after reassignments to the first i loads (from 1 to i).

The recurrence relation for the cost matrix for single phase loads defined by Equation (5):

$$C[x,y,i] = \text{Min}[C[x-l_i,y,i-1]+t(i,1), C[x,y-l_i,i-1]+t(i,2), C[x,y,i-1]+t(i,3)], \quad (5)$$

with $l_i$ denoting the weight of ith load (single phase load), $t(i,\phi)$ denoting the cost of moving the $i_{th}$ load to phase $\phi$, and C[x, y, i] denoting the minimum number of tap changes to move from the initial status to [x, y, $T_i - x - y$], with $T_i$ provided by Equation (6):

$$T_i = \sum_{j=1}^{i} L_j \quad (6)$$

If the $i_{th}$ load stays on phase $\phi$, then $t(i,\phi) = 0$. If the $i_{th}$ load leaves phase $\phi$, then $t(i,\phi) = 1$. Assuming the ith load is initially on phase a, then the optimal solution either leaves load i on phase a (incurring no cost for the move), moves to phase b, or moves to phase c (both of which incur a cost of one operation).

Similar recurrences are needed when load i is on phase b or phase c, with the basis of this recurrence being C[$L_1$, $L_2$, 0] = 0, C[$x_0$, $y_0$, 0] = ∞ for all $x_0 \ne L_1$ and $y_0 \ne L_2$, meaning that no other states are achievable with zero moves.

For two and three phase loads, with the ith load having three single phase loads $l_{i,a}$, $l_{i,b}$, $l_{i,c}$ initially on phase a, b and c, the recurrence relation is defined by Equation (7):

$$C[x,y,i] = \text{Min}[c[x-l_{i,a},y-l_{i,b},i-1], c[x-l_{i,a},y-l_{i,c},i-1]+1, c[x-l_{i,b},y-l_{i,a},i-1]+1, c[x-l_{i,b},y-l_{i,c},i-1]+1, c[x-l_{i,c}, y-l_{i,a},i-1]+1, c[x-l_{i,c},y-l_{i,b},i-1]+1] \quad (7)$$

In step 902 of FIG. 9, the path is recorded. As explained above, when calculating the number of tap changes for each [x, y, i], one needs to create a three dimensional path matrix (since C is three dimensional) to record what is the 'parent' of a status [x, y, i], i.e., to record the parent's position of [x, y, i] as a cell. The record of these relationships provides the paths.

In step 903 of FIG. 9, objective values are calculated. After using the recurrence to record the path, the objective values are calculated for all $(T_i+1)^2$ possible [x, y, i] using objective function for all $i \in [1, n-1]$. Then, to take the imbalance of each section into consideration, one can calculate the weighted sum objective values for each path.

In step 904 of FIG. 4, the overload is avoided. One needs to delete the solutions that cause overload on the feeders by setting the positions that have indexes larger than the line capacity to infinity. The deletion simply removes the incoming or outgoing edges to these nodes, to ensure that all three phase currents in each section are smaller or equal to the line capacity.

In step 905 of FIG. 9, a phase assignment recommendation is provided.

For the first approach of limiting all PUI's of each section under a threshold, for a threshold of 'what is balanced enough,' then any partial solution that is not 'balanced enough' is deleted. Any remaining solution would be found by any path from an end state to a state that passes through balanced enough vertices.

If there is no threshold but the path is to be found with minimum balance, a binary search is performed on possible thresholds. A possible threshold is repeated picked in the middle of the range of possible thresholds and all vertices that are more unbalanced are deleted. A path is identified in the remaining graph. If found, a smaller threshold is tried. If not, a larger threshold is tried.

For the second approach of minimizing the weighted sum of phase unbalance indexes for each section of the feeder, consideration is made that one has three matrixes: the number of tap changes (cost) matrix $C[x, y, N]$, the path matrix and objective values matrix $Objv[x, y, N]$. A table is formed with N rows and three columns, the first column of which is a maximum permitted number of tap changes. The second column is a corresponding best available objective value, obtained by searching all each x and y in $Objv[x, y, N]$ that satisfies $C[x, y, N]$=maximum number of permitted tap changes. The third column is a corresponding phase assignment for each load, which can be obtained by retrieving the path. This table is utilized to make the phase assignment recommendations provided for the desired number of tap changes or objective values. Other data structures can be adapted to implement these steps, including a graphical representation, including with arcs and nodes, of data processing, tree graphs and table representation. Also provided is an iterative method to balance tree network feeders. For tree network feeders, one can use the dynamic programming algorithm above to balance each subtree feeder and take every subtree feeders as equivalent nodes in the upper level of the tree. One can balance the whole system using this bottom-up method.

Figure 10:
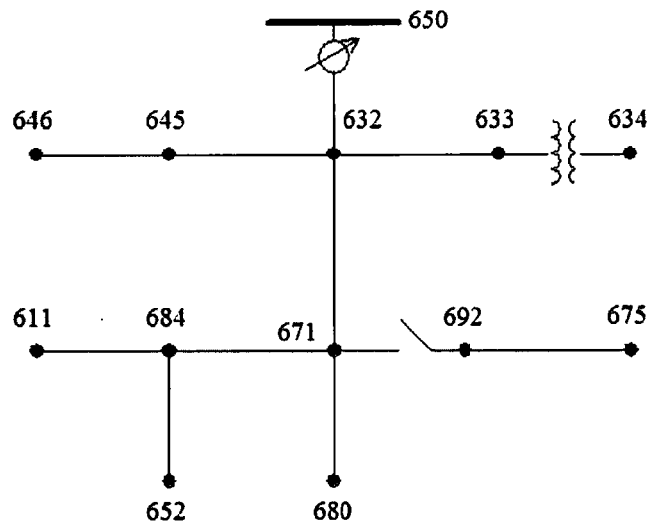
FIG. 10 illustrates a feeder with thirteen nodes according to an embodiment of the present invention.

FIG. 10 provides an example of use of the algorithm to balance three phase current of a sample having thirteen nodes and several branch feeders forming a tree network. The nodes are divided into five groups: node 632, 645 and 646 as group A, nodes 633 and 634 as group B, nodes 692 and 675 as group C, nodes 611, 684 and 652 as group D, and nodes 671 and 680 as group E. Groups A and B are taken as one node and are first balanced. A second balance group of node groups C, D and E are taken as a second equivalent node group for balancing.

Figure 11:
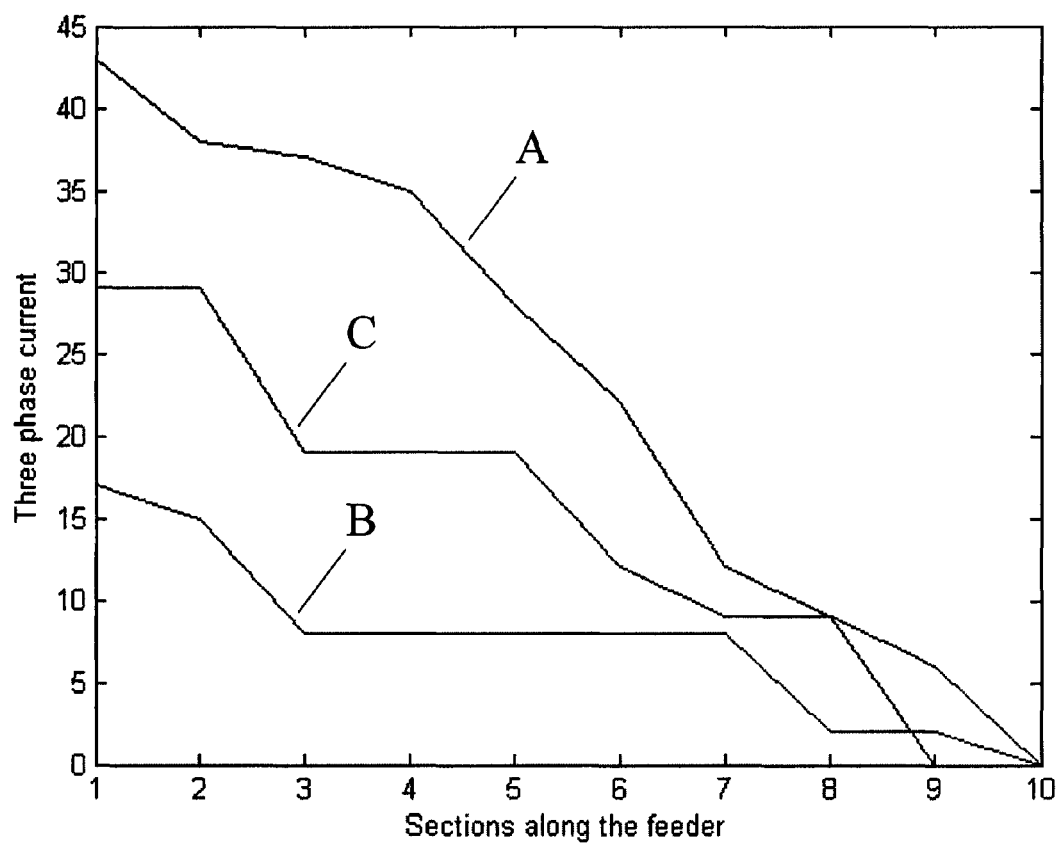
FIG. 11 illustrates three phase current along a feeder before phase balancing according to an embodiment of the present invention.
Figure 12:
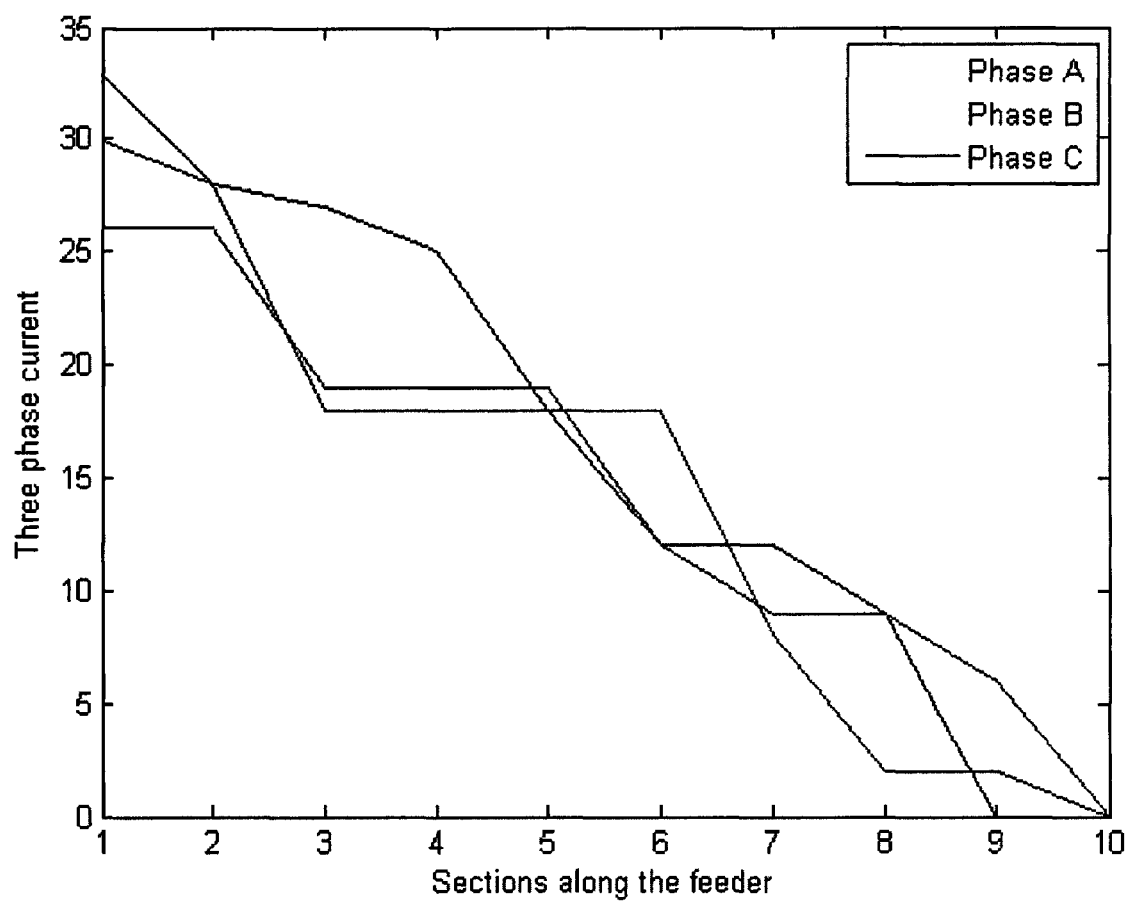
FIG. 12 illustrates three phase current along the feeder after phase balancing according to the present invention.
Figure 13:
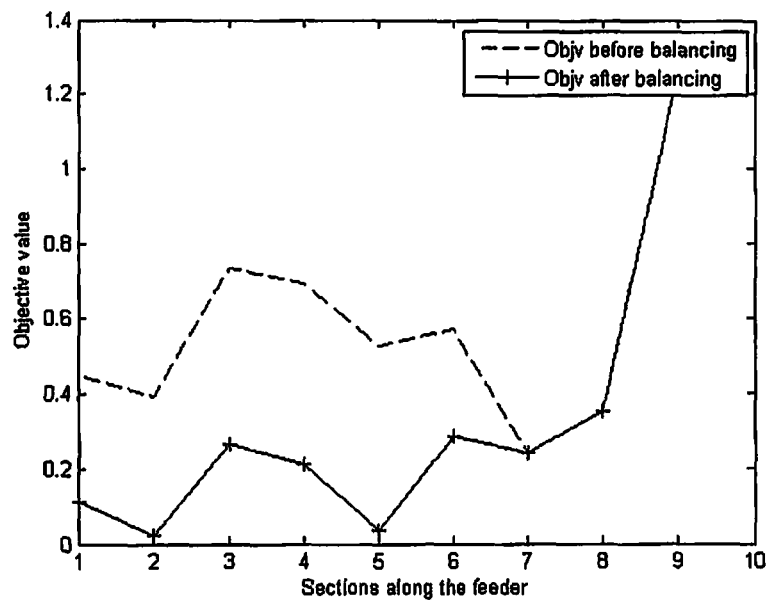
FIG. 13 illustrates objective values before and after phase balancing.

Simulation was preformed implementing a twenty-node feeder with ten randomly generated loads and phases for testing. FIGS. 11 and 12 show the three phase currents for each section, before and after phase balancing, respectively. FIG. 13 shows the corresponding objective values. Note that in the objective values at the end of the curves in FIG. 13 are worse, due to reduced flexibility in making tap changes at that point. In fact, no tap changes were made for the last two loads in the example. Tables 3 and 4 show the phase assignment for each load before and after phase balancing.

TABLE 3

| Load index | 1 | 2 | 3 | 4 | 5 | 6 | 7 | 8 | 9 | 10 |
|---|---|---|---|---|---|---|---|---|---|---|
| a: | 0 | 5 | 1 | 2 | 7 | 6 | 10 | 3 | 9 | 0 |
| b: | 0 | 2 | 7 | 0 | 0 | 0 | 0 | 6 | 0 | 2 |
| c: | 5 | 0 | 10 | 0 | 0 | 7 | 3 | 0 | 3 | 6 |

TABLE 3-continued

| Load index | 1 | 2 | 3 | 4 | 5 | 6 | 7 | 8 | 9 | 10 |
|---|---|---|---|---|---|---|---|---|---|---|
| Total on a: | 0 | 5 | 6 | 8 | 15 | 21 | 31 | 34 | 43 | 43 |
| Total on b: | 0 | 2 | 9 | 9 | 9 | 9 | 9 | 15 | 15 | 17 |
| Total on c: | 5 | 5 | 15 | 15 | 15 | 22 | 25 | 25 | 28 | 34 |

TABLE 4

| Load index | 1 | 2 | 3 | 4 | 5 | 6 | 7 | 8 | 9 | 10 |
|---|---|---|---|---|---|---|---|---|---|---|
| a: | 0 | 5 | 1 | 2 | 7 | 6 | 0 | 3 | 9 | 0 |
| b: | 0 | 2 | 10 | 0 | 0 | 0 | 10 | 6 | 0 | 2 |
| c: | 5 | 0 | 7 | 0 | 0 | 7 | 3 | 0 | 3 | 6 |
| Total on a: | 0 | 5 | 6 | 8 | 15 | 21 | 21 | 24 | 33 | 33 |
| Total on b: | 0 | 2 | 12 | 12 | 12 | 12 | 22 | 28 | 28 | 30 |
| Total on c: | 5 | 5 | 12 | 12 | 12 | 19 | 22 | 22 | 25 | 31 |

Figure 14:
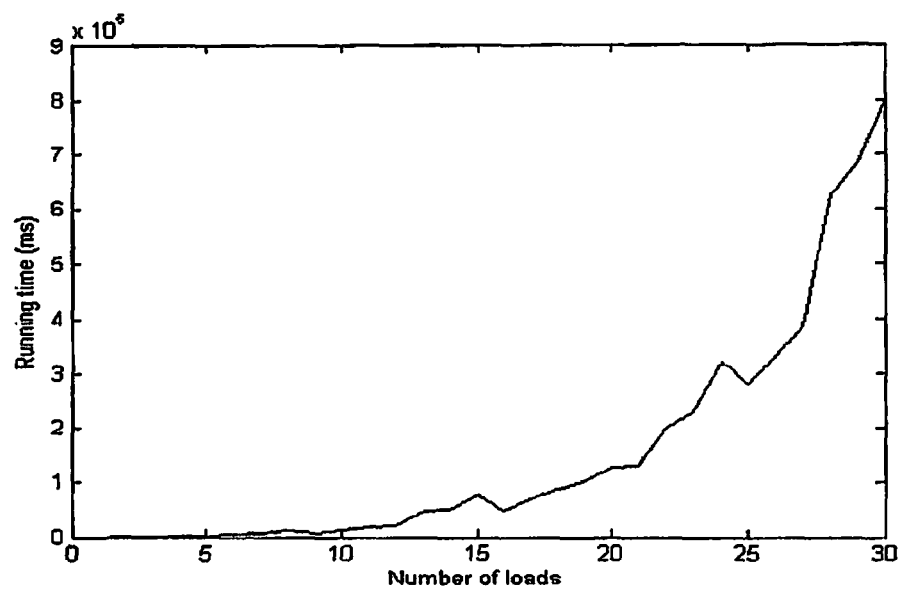
FIG. 14 illustrates running time versus number of loads.
Figure 15:
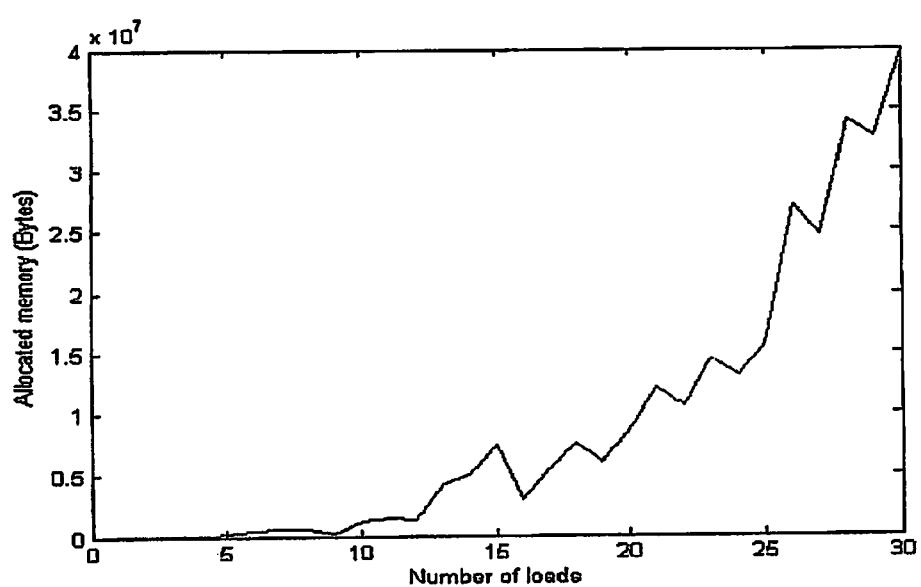
FIG. 15 illustrates running time versus allocated memory.

To illustrate running time and required memory, without the above-described memory reducing option discussed above, randomly generated loads and phases were used. FIGS. 14 and 15 illustrate illustrates running time versus number of loads and running time versus allocated memory, respectively. In FIGS. 14 and 15, the horizontal axis is the number of loads and the vertical axes are running time in ms and allocated memory in bytes.

Advantages of the present inventive technology include use of dynamic programming allows a better quality combinatorial solution at much less the cost of an exhaustive search.

In the preferred aspects, a system and method are provided for load balancing in electric distribution substations with an algorithm for optimal tap change determination for phase swapping, with the system including a processor configured to execute the above described method. The methods of the preferred aspects are implemented in systems that use software run on a computer processor to carry out the above described methods. While in preferred embodiments, the methods are carried out in an automated format, entirely within the computer processor, it should be understood that one or more components may be carried out by a human and that the methods may involve human interaction or intervention at one or more points.

The computer processor for conducting aspects of the methods of the present invention may be housed in devices that include desktop computers, scientific instruments, handheld devices, personal digital assistants, phones, a non-transitory computer readable medium, and the like. The methods need not be carried out on a single processor. For example, one or more steps may be conducted on a first processor, while other steps are conducted on a second processor. The processors may be located in the same physical space or may be located distantly. In certain embodiments, multiple processors are linked over an electronic communications network, such as the Internet. Preferred embodiments include processors associated with a display device for showing the results of the methods to a user or users, outputting results as a video image that includes feeder outlines or motifs. The processors may be directly or indirectly associated with information databases. As used herein, the terms processor, central processing unit, and CPU are used interchangeably and refer to a device that is able to read a program from a computer memory, e.g., ROM or other computer memory, and perform a set of steps according to the program. The terms computer memory and computer memory device refer to any storage media readable by a computer processor. Examples of computer memory include, but are not limited to, RAM, ROM, computer chips, digital video discs, compact discs, hard disk drives and magnetic tape. Also, computer readable medium refers to any device or system for storing and providing information, e.g., data and instructions, to a computer processor, DVDs, CDs, hard disk drives, magnetic tape and servers for streaming media over networks. As used herein, encode refers to the process of converting one type of information or signal into a different type of information or signal to, for example, facilitate the transmission and/or interpretability of the information or signal. For example, image files can be converted into, i.e., encoded into, electrical or digital information.

While the invention has been shown and described with reference to certain aspects thereof, it will be understood by those skilled in the art that various changes in form and details may be made therein without departing from the spirit and scope of the present invention as defined by the appended claims and equivalents thereof.

What is claimed:

1. A method for load-balancing in a three-phase electric power distribution system having a multi-phase feeder, the method comprising:
   obtaining topology information of the multi-phase feeder by identifying supply points for a plurality of customer loads and identifying feeder sections between the supply points;
   obtaining customer information;
   performing a phase balancing analysis, wherein the phase balancing analysis includes a Phasing Unbalance Index (PUI), and wherein the PUI is determined by:

$$PUI_i = \frac{\text{Max}(|I_{a,i} - I_{avg_i}|, |I_{b,i} - I_{avg_i}|, |I_{c,i} - I_{avg_i}|)}{I_{avg_i}} * 100\%,$$

wherein $I_{a,i}$, $I_{b,i}$ and $I_{c,i}$ are total current loads on phases a, b, c, of feeder section i, and $I_{avg_i}$ is a mean value of a current load on each phase of feeder section i; and
   recommending phase assignment at supply points for the plurality of customer loads,
   wherein the customer information includes peak customer load at each supply point.

2. The method of claim 1, wherein the phase balancing analysis includes calculating load balance for a plurality of simulated tap changes of the plurality of customer loads and the peak customer load corresponds to a peak loading time.

3. The method of claim 1, wherein the phase balancing analysis considers single phase loads to be a subset of three phase loads.

4. The method of claim 1, wherein a load range is set as an integer between 1 and 100, and n loads are assumed, with an ith load having weights of $l_{i,a}$, $l_{i,b}$ and $l_{i,c}$ on respective feeder phases.

5. The method of claim 4, wherein each of the weights is an integer, and a total feeder load (T) is determined by:

$$T = \Sigma_{i=1}^n \Sigma_{\phi=a}^c l_{i,\phi}.$$

6. The method of claim 1, wherein a threshold limits the PUI of each feeder section.

7. The method of claim 1, wherein a weighted sum (S) of the PUI of each feeder section is determined by:

$$S = \sum_{i=1}^{i=N} w_i * PUI_i,$$

wherein $w_i = \Sigma I_{\phi,i}$, $I_{\phi,i} \leq C_i$, $\phi$ denotes phases a, b and c, i denotes a feeder section index, and C denotes phase line capacity.

8. The method of claim 1, further comprising creating N objective function matrices and N cost matrices, with one objective function matrix and one cost matrix for each feeder section.

9. The method of claim 1, further comprising creating a cost matrix having a recurrence relation by:

$$C[x,y,i] = \text{Min}[C[x-l_i,y,i-1]+t(i,1), C[x,y-l_i,i-1]+t(i,2), C[x,y,i-1]+t(i,3)],$$

with $l_i$ denoting a weight of an ith single phase load, $t(i,\phi)$ denoting a cost of moving the $i_{th}$ single phase load to phase $\phi$, and C[x, y, i] denoting a minimum number of tap changes.

10. An apparatus for balancing three-phase feeder loading, the apparatus comprising:
    a controller configured to receive topology information of a feeder, to receive customer information, to perform a phase balancing analysis, and to recommend phase assignment at one or more supply points for a plurality of customer loads, wherein the phase balancing analysis identifies a Phasing Unbalance Index (PUI), and wherein the PUI is determined by:

$$PUI_i = \frac{\text{Max}(|I_{a,i} - I_{avg_i}|, |I_{b,i} - I_{avg_i}|, |I_{c,i} - I_{avg_i}|)}{I_{avg_i}} * 100\%,$$

wherein $I_{a,i}$, $I_{b,i}$ and $I_{c,i}$ are total current loads on single phases a of feeder section i, and $I_{avg_i}$ is a mean value of a current load on each feeder section; and
    a display configured to output determined optimal tap changes for phase swapping,
    wherein the topology information includes supply points for the plurality of customer loads and feeder sections between the supply points, and the customer information includes peak customer load at each supply point.

11. The apparatus of claim 10, wherein the phase balancing analysis includes calculating load balance for a plurality of simulated tap changes of the plurality of customer loads.

12. The apparatus of claim 10, wherein the phase balancing analysis considers single phase loads to be a subset of three phase loads.

13. The apparatus of claim 10, wherein the controller sets a load range between 1 and 100, with each load scaled to an integer value in the load range.

14. The apparatus of claim 13, wherein a total feeder load (T) is determined by:

$$T = \Sigma_{i=1}^n \Sigma_{\phi=a}^c l_{i,\phi} \quad (4)$$

with n being a total number of loads, with an ith load having weights of $l_{i,a}$, $l_{i,b}$ and $l_{i,c}$ on respective feeder phases.

15. The apparatus of claim 10, wherein the controller determines a weighted sum (S) of each feeder section PUI by:

$$S = \sum_{i=1}^{i=N} w_i * PUI_i,$$

wherein $w_i = \Sigma I_{\phi,i}$, $I_{\phi,i} \leq C_i$; $\phi$ denotes phases a, b and c, i denotes a feeder section index, and C denotes phase line capacity.

16. The apparatus of claim 10, wherein the controller creates a cost matrix having a recurrence relation by:

$$C[x,y,i] = \text{Min}[C[x-l_i,y,i-1]+t(i,1), C[x,y-l_i,i-1]+t(i,2), C[x,y,i-1]+t(i,3)], \quad (5)$$

wherein $l_i$ denotes a weight of an ith single phase load, $t(i,\phi)$ denotes a cost of moving the $i_{th}$ single phase load to phase $\phi$, and C[x, y, i] denotes a minimum number of tap changes.

17. A method for load-balancing in a three-phase electric power distribution system having a multi-phase feeder, the method comprising:
obtaining topology information of the multi-phase feeder by identifying supply points for a plurality of customer loads and identifying feeder sections between the supply points;
obtaining customer information;
performing a phase balancing analysis, wherein the phase balancing analysis includes a Phasing Unbalance Index (PUI), and wherein a weighted sum (S) of the PUI of each feeder section is determined by:

$$S = \sum_{i=1}^{i=N} w_i * PUI_i,$$

wherein $w_i = \Sigma I_{\phi,i}$, $I_{\phi,i} \leq C_i$; $\phi$ denotes phases a, b and c, i denotes a feeder section index, and C denotes phase line capacity; and
recommending phase assignment at supply points for the plurality of customer loads,
wherein the customer information includes peak customer load at each supply point.

18. The method of claim 17, wherein the phase balancing analysis includes calculating load balance for a plurality of simulated tap changes of the plurality of customer loads and the peak customer load corresponds to a peak loading time.

19. The method of claim 17, wherein the phase balancing analysis considers single phase loads to be a subset of three phase loads.

20. The method of claim 17, wherein the PUI is determined by:

$$PUI_i = \frac{\text{Max}(|I_{a,i} - I_{avg_i}|, |I_{b,i} - I_{avg_i}|, |I_{c,i} - I_{avg_i}|)}{I_{avg_i}} * 100\%,$$

wherein $I_{a,i}$, $I_{b,i}$ and $I_{c,i}$ and are total current loads on phases a, b, c, of feeder section i, and $I_{avg_i}$ is a mean value of a current load on each phase of feeder section i.

21. The method of claim 20, wherein a load range is set as an integer between 1 and 100, and n loads are assumed, with an ith load having weights of $l_{i,a}$, $l_{i,b}$ and $l_{i,c}$ on respective feeder phases.

22. The method of claim 21, wherein each of the weights is an integer, and a total feeder load (T) is determined by:

$$T = \Sigma_{i=1}^{n} \Sigma_{\phi=a}^{c} l_{i,\phi} \quad (4)$$

23. The method of claim 17, wherein a threshold limits the PUI of each feeder section.

24. The method of claim 17, further comprising creating N objective function matrices and N cost matrices, with one objective function matrix and one cost matrix for each feeder section.

25. The method of claim 17, further comprising creating a cost matrix having a recurrence relation by:

$$C[x,y,i] = \text{Min}[C[x-l_i,y,i-1]+t(i,1), C[x,y-l_i,i-1]+t(i,2), C[x,y,i-1]+t(i,3)], \quad (5)$$

with $l_i$ denoting a weight of an ith single phase load, $t(i,\phi)$ denoting a cost of moving the $i_{th}$ single phase load to phase $\phi$, and C[x, y, i] denoting a minimum number of tap changes.

* * * * *